United States Patent [19]

Borman et al.

[11] 4,419,485

[45] Dec. 6, 1983

[54] SHAPED ARTICLES AND PROCESS FOR THE PRODUCTION THEREOF

[75] Inventors: Willem F. H. Borman; Morton Kramer; Eugene P. Reilly, all of Pittsfield, Mass.

[73] Assignee: General Electric Company, Pittsfield, Mass.

[21] Appl. No.: 223,943

[22] Filed: Jan. 12, 1981

Related U.S. Application Data

[63] Continuation of Ser. No. 144,536, Apr. 28, 1980, abandoned, which is a continuation of Ser. No. 610,094, Sep. 2, 1975, abandoned, which is a continuation of Ser. No. 382,512, Jul. 25, 1973, abandoned.

[51] Int. Cl.$^3$ .................. C08G 63/76; C08F 283/00; C08L 67/00
[52] U.S. Cl. ..................................... 525/437; 264/51; 264/54; 264/322; 264/515; 528/272; 528/308
[58] Field of Search .............. 528/272, 308; 525/437; 264/89, 90, 92, 93, 94, 95, 96, 97, 98, 51, 54, 322, 515

[56] References Cited

U.S. PATENT DOCUMENTS

| 3,029,471 | 4/1962 | Adams et al. | 18/30 |
|---|---|---|---|
| 3,163,693 | 12/1964 | Stenger | 264/329 |
| 3,231,642 | 1/1966 | Goldman et al. | 264/25 |
| 3,337,665 | 8/1967 | Underwood et al. | 264/95 |
| 3,692,744 | 9/1972 | Rich et al. | 260/75 T |
| 3,745,150 | 7/1973 | Leonard | 260/75 T |
| 3,814,786 | 6/1974 | Gall et al. | 264/98 |
| 3,822,332 | 7/1974 | Hrach et al. | 264/97 |
| 4,145,466 | 3/1979 | Leslie et al. | 428/35 |

*Primary Examiner*—Lucille M. Phynes
*Attorney, Agent, or Firm*—Hedman, Casella, Gibson, Costigan & Hoare

[57] ABSTRACT

Shaped articles comprising a branched, high molecular weight poly(alkylene terephthalate) polyester resin and obtained by providing a molten, self-supporting preform of the resin, shaping the molten preform into a final form and allowing the shaped preform to cool to structural rigidity.

13 Claims, 1 Drawing Figure

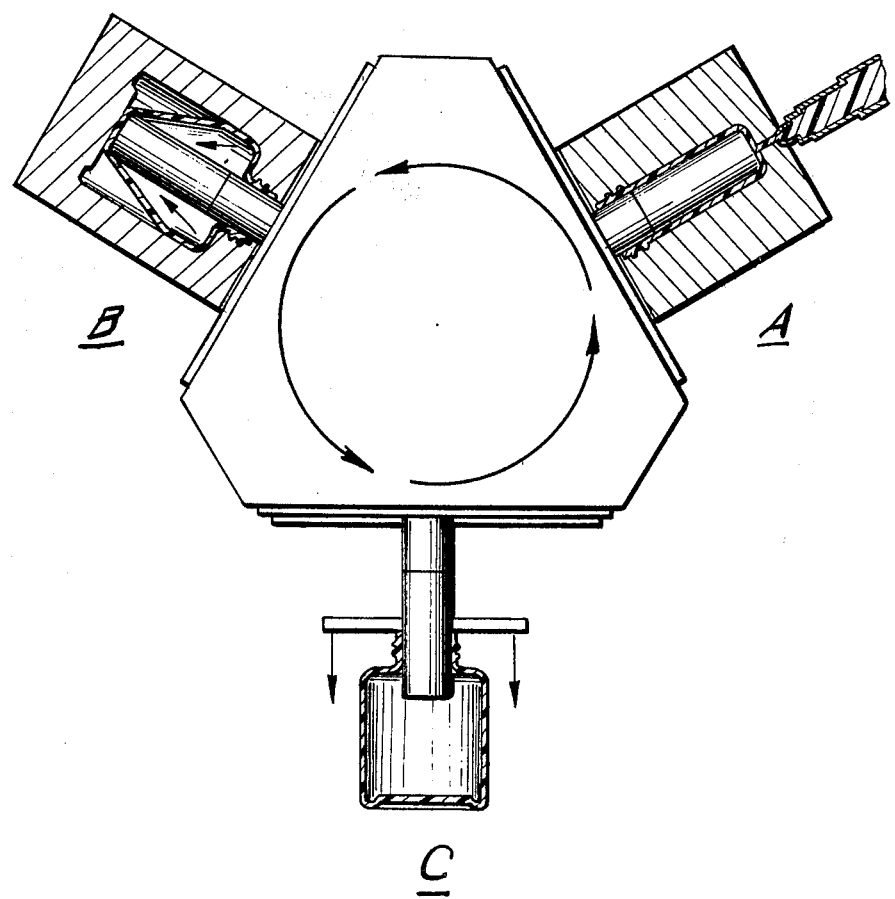

SHAPED ARTICLES AND PROCESS FOR THE PRODUCTION THEREOF

This is a continuation of application Ser. No. 144,536 filed Apr. 28, 1980, which is a continuation of Ser. No. 610,094, filed Sept. 2, 1975 which is a continuation of Ser. No. 382,512, filed July 25, 1973, all now abandoned.

This invention relates to shaped thermoplastic articles and to methods for their production. More particularly, it relates to articles prepared from branched polyester resins having improved processability in a molten preform state because of increased melt strength and elasticity.

BACKGROUND OF THE INVENTION

Plastics fabrication techniques, such as extrusion blow molding, injection blow molding, profile extrusion, pipe extrusion, blown film extrusion, co-extrusion (with a second plastic material), extrusion coating, foam molding, foam extrusion, thermoforming, and the like, all require the plastic composition to have a high melt viscosity and melt strength (melt elasticity) during processing.

Linear polyesters have a low melt elasticity and are therefore not suitable for these applications.

It has now been discovered that introduction of even a low degree of branching causes the necessary increase in melt elasticity and melt viscosity at low shear rates, which make these modified polyesters uniquely suitable for use in the applications mentioned.

Blow molding is used to make hollow shaped plastic articles in a variety of commonly encountered forms, such as milk bottles, auto windshield washer tanks, street light globes, arms and legs on toy dolls, and a multitude of others. There are two basic types of blow molding processes, both being fundamentally related, but technologically dissimilar. Extrusion blow molding typically comprises extruding a tube of plastic into a water-cooled mold, inflating the tube by internally introducing air or another gas until the walls of the molten tube assume the shape of the mold, allowing the shaped tube to cool to structural rigidity, and removing the extrusion blow molded part from the mold.

Another major technique, injection blow molding, involves, instead of extrusion, injection molding the plastic around core pins in an injection mold, then transferring to the blow mold. The fundamental difference between injection blow molding and extrusion blow molding is that with the former, two complete sets of molds are required—as injection mold for molding the preform and a blow mold for the final form.

Until now, polyolefin resins have been the plastics of choice for extrusion blow molding and while injection blow molding can use a greater variety of resins, even including poly(vinyl chloride) resins, not all of them can be substituted into the extrusion blow molding process because of a fundamental lack of melt strength and elasticity.

Most thermoplastics, and even polyolefins, have their shortcomings in extrusion blow molding, especially if the preformed molten tubes (parisons) are too big and heavy. The tubes stretch and become difficult to handle and special equipment is needed to prevent this hot stretch. Moreover, the parts must often be removed from the blow mold while still warm and supported on special "cool-down" fixtures to avoid tearing, etc.

Injection blow molding is illustrated in the drawing. At position "A:", the hot plastic is injected into a hot mold around a pin, the preform being called a "parison." The outer mold is removed, and the "parison", still molten, is rotated to position "B", where it is surrounded by a mold in the shape of the final part. The molten plastic is now inflated (e.g., by air) to fill this mold, and is cooled to solidify. Inflation of the polymer melt is the critical step, requiring good melt elasticity for its successful completion. Linear polyesters, e.g., polybutylene terephthalate, in such an application, tend to run, droop, and/or "burst", making it impossible to obtain a useful part.

After an additional 120° rotation, position "C", the final part, is removed from the mold (step C). Obviously, this technique is distinct from ordinary injection molding, in which a molten plastic is injected into a mold and cooled without further processing. There is no concern at all there with the need for self-support in the molten preform.

Other "blow" techniques have in common with the injection blow molding process that the molten polymer is inflated (by air, or a suitable inert gas) to assume its final desired shape. In extrusion blow molding an extruded tube is inflated inside a mold; in blown film extrusion an extruded tube is continuously inflated to a large diameter tube of low well thickness, which is subsequently collapsed and further processed to yield film, (grocery) bags, etc., and in foam molding or foam extrusion applications a cellular structure is introduced in the plastic through expansion of an inert gas, again requiring high melt elasticity to prevent collapse of the foam before the part has solidified.

In extrusion of profiles of closely controlled shape and dimensions it is important that the molten plastic upon leaving the extruder die does not sag or drool until it has hardened or solidified. Polyesters of the branched structure have been now discovered to have a high melt viscosity under the low shear forces acting on the extrudate, preventing sagging and drooling; at the same time, they exhibit significantly lower melt viscosities under the high shear rate conditions existing in the extruder die, facilitating the passage of the melt through the die without requiring excessive pressures in the extruder barrel. The branched polyesters are therefore uniquely suited for precision extrusion applications such as are required for profile and tubing extrusions, extrusion coatings and coextrusions.

In thermoforming, a sheet of plastic is suspended horizontally over a suitable mold and heated, usually by radiant heat, until melted. The sheet is then brought into contact with the mold and collapsed onto it by suction. After cooling, the plastic, which has assumed the shape of the mold is lifted off, trimmed and decorated as desired.

Obviously, this application too calls for a high degree of elasticity of the polymer melt to prevent premature sagging and running of the material.

Shaped articles having excellent appearance and physical properties can be obtained if branched, high molecular weight poly(alkylene terephthalate) resins are used as the thermoplastic. In admixture with another thermoplastic, sufficient branched such polyesters will be used to provide melt strength and elasticity. More particularly, if a branching component with functionality of greater than 2, i.e., at least 3, is used in a reaction with either a dialkyl terephthalate or terephthalic acid, and an alkylene glycol as a component of the reaction mixture there is formed a highly branched polyester with properties allowing its use in techniques where a self-supporting preform is essential. The relative degree of branching is indicated by the relative diameter during extrusion, due to die swell of the material relative to unbranched materials. The branched materials show a surprising and unexpected improvement in melt strength in comparison with the unbranched materials.

Although similar polyesters are the subject matter of U.S. Pat. No. 3,692,744, these are described and claimed in the form of injection molded articles. They are characterized in the patent as providing molded articles having improved shock resistance. There is no hint or suggestion in the patent that the branched polyesters will have improved processability during molding and there is no suggestion that the branched polyester will have improved melt characteristics which makes them suitable for techniques where self-supporting preforms with high melt strengths are essential. Thus, even though applicants contemplate using quite similar plastics compositions, it is the discovery of their unique utility in the fields specified above which is the primary basis for patentability over the injection molded, high impact strength compositions described in U.S. Pat. No. 3,692,744.

DESCRIPTION OF THE DRAWING

The drawing illustrates in semi-schematic fashion, an injection blowing technique which is one means for preparing the articles and practicing the method of this invention.

DESCRIPTION OF THE INVENTION

According to the present invention there are provided shaped articles comprising branched, high molecular weight poly(alkylene terephthalate) resins and obtained by providing a molten, self-supporting, three-dimensional preform of the polyester resin or a mixture thereof with another thermoplastic resin, said mixture including at least sufficient such polyester to render said preform self-supporting in the molten state, shaping the molten preform into a final form, and allowing the shaped preform to cool to structural rigidity.

According to another preferred feature of this invention there is provided a process for preparing such shaped articles, the process comprising:

(a) providing a molten, self-supporting, three-dimensional preform of a branched, high molecular weight poly(alkylene terephthalate) resin or a mixture thereof with another thermoplastic resin, said mixture including at least sufficient such polyester to render said preform self-supporting in the molten state:

(b) shaping the molten preform into a final form; and (c) allowing the preform to cool to structural rigidity.

The term "high molecular weight poly(alkylene terephthalate) resin" includes, in general, saturated condensation products of diols and dicarboxylic acids, or reactive derivatives thereof. Preferably, they will comprise condensation products of aromatic dicarboxylic acids or esters and aliphatic diols and they will be branched either by cross-linking through chemical linkages or in other known manners. It is to be understood that it is also possible to include cyclic aliphatic linkages, such as those derived from 1,4-dimethylolcyclohexane. In addition to the terephthalic acid units, other dicarboxylic acids, such as adipic acid, naphthalene dicarboxylic acid, isophthalic and o-phthalic acid can be used, e.g., from about 0.5 to about 15 mole % of the total acid units. The alkylene constituent can likewise be varied, and may comprise units derived from ethylene glycol, propylene glycol, 1,4-butanediol, 1,6-hexanediol, 1,10-decanediol, the cyclo aliphatic diols, mixtures thereof and the like. Preferably, the alkylene units will contain from 2 to 6 carbon atoms, and especially preferably, the alkylene units will be 1,4-butylene units, because these provide polyesters which crystallize very rapidly from the melt.

The branching component used in the polyesters will contain at least three ester forming groups. It can be one which provides branching in the acid unit portion of the polyester, or in the glycol unit portion, or be a hybrid. Illustrative such branching components are tri or tetracarboxylic acids, such as trimesic acid, pyromellitic acid and lower alkyl esters thereof, and the like, or, preferably, polyols, and especially preferably tetrols, such as pentaerythritol, triols, such as trimethylolpropane, or dihydroxy carboxylic acids and hydroxydicarboxylic acid and derivatives, such as dimethyl hydroxy-terephthalate, and the like.

The relative amount of the branching component used in the reaction mixture can vary, but is always preferably kept at a minor proportion, e.g., of up to 5 mole % maximum, for every 100 moles of the terephthalate units in the branched polyester. Preferably, the range of branching component included in the esterification mixture (and, generally, that included in the product), will be from 0.05 to 3 mole % based on the terephthalate units. Especially preferably, it will comprise from about 0.1 to about 1 mole %, based on the terephthalate component.

Processes for preparing such polyesters will be well known to those skilled in the art. The description in U.S. Pat. Nos. 2,465,319 and 3,047,539 are helpful, as are those in the aforesaid U.S. Pat. No. 3,692,744. A detailed description is also included herein.

In general, it is convenient to add small amounts of the branching components to the terephthalic acid or ester and an excess of the alkylene glycol in the presence of a conventional polyester catalyst then to heat to form a prepolymer and finally to heat under a high vacuum until the desired degree of polymerization is reached.

The molecular weight of the branched polyester should be sufficiently high to provide an intrinsic viscosity of about 0.6 to 2.0 deciliters per gram, and preferably 0.7 to 1.6 dl./g., measured for example, as a solution in a 60:40 mixture of phenol and tetrachloroethane at 30° C.

The polyesters can be combined with conventional additives, such as stabilizers, antioxidants, plasticizers, lubricity promoters, dyes, pigments, flame retardant additives and the like.

The articles are produced in equipment conventionally used for shaping of thermoplastic compositions by extrusion blow molding, injection blow molding, profile extrusion, pipe extrusion, co-extrusion, extrusion coating, foam molding, foam extrusion, thermoforming, and the like. In extrusion blow molding, for example, they can be made on continuous extrusion transfer equipment in which a single manifold die head forms the hollow tube for continuous introduction, after cutting the proper length, into a number of blowing molds. Also useful is a continuous extrusion preform transfer process calling for the extruded tube to be deposited in a shaping or preforming mold where the bottom is closed and sealed while the neck is held open around a mandrel and the neck configuration (threads, etc.) is preformed. The still molten, but preshaped hollow shape is then removed from the shaping mold and placed in a blow mold where it is expanded to its final configuration. Still another process is called continuous extrusion, ferris wheel, which uses equipment having a vertical wheel or endless belt—located next to the die of the continuous tube extruder—on which a series of split blowing molds are mounted. Each of the molds is independently operated, hydraulically or pneumatically. While the wheel turns, one mold at a time passes under the extruder die to receive and close around the molten tube. Rotation of the mold carrier is set to provide ample time for an open mold to receive the tube and then to blow, cool and eject the hollow molded piece. Other conventional equipment may also be used.

Injection blow molding is illustrated in the drawing. Other techniques are known to those skilled in this art and are illustrated in the examples.

Conventional equipment temperatures will be employed, e.g., 300°–600° F., the conventional mold temperatures, e.g., 100°–200° F. are useful. If necessary, those skilled in the art will be able to make conventional adjustments to accommodate the variations in molecular weight, degree of branching, and the like, in the polyester molding materials.

DESCRIPTION OF THE PREFERRED EMBODIMENTS

The following examples illustrate the preparation of certain articles within the scope of this invention. They are not to be construed to limit the invention in any manner whatsoever. All parts, except as otherwise indicated, are by weight.

EXAMPLES 1–3

To a 100 gallon stainless steel reaction vessel are charged 141 lbs. of dimethyl terephthalate (0.727 lb. moles), 114 lbs. of 1,4-butanediol (1.267 lb. moles), 32.0 g. of tetraoctyl titanate (esterification catalyst) and 64 g. of pentaerythritol (0.1 wt. %; 0.142 mol % based on the terephthalate). The charge is heated to 190° C. and after removal of the methanol, vacuum is applied to remove the excess butanediol. The prepolymer is then transferred to a larger polymerization vessel and heated at about 255° C. under a high vacuum until the melt viscosity reaches 10,000 poises. The branched polyester is cooled, comminuted and can be preformed and shaped into objects having excellent appearance and mechanical properties. Other significant properties are tabulated hereinafter.

COMPARATIVE EXAMPLES 1A AND 2A

The procedure of Example 1 is repeated, omitting the branching component, pentaerythritol. The reaction is also terminated when the melt viscosity reaches 10,000 centipoises. The polyester is unbranched.

The relative swell and melt strength of both polyesters are measured and the results are summarized in the Table together with results of other similar runs, to higher degrees of polymerization, and with various concentrations of branching component:

TABLE

Comparison of Branched and Unbranched Poly-(1,4-butylene terephthalates)

| Example | 1 | 2 | 3 | 1A* | 2A* |
|---|---|---|---|---|---|
| Wt. % branching component** | 0.1 | 0.1 | 0.15 | — | — |
| Melt viscosity (poise) | 10,000 | 11,000 | 12,000 | 10,000 | 14,000 |
| Die Swell (strand diameter),in.*** | 0.10 | 0.11 | 0.14 | 0.04 | 0.04 |
| Melt strength**** | 5 | 5 | 5+ | 1 | 1.2 |

*Control
**Pentaerythritol
***As measured on a single screw extruder under constant conditions.
****As measured by tearing of the melt; relative scale 1 to 10, where 10 is undesirable highly cross-linked polymer.

EXAMPLE 4

Shaped articles are made by injection blow molding. Branched poly(butyleneterephthalate) (PET), containing 0.22 mole % pentaerythritol branching agent, with a melt viscosity of 250° C. of 10,000 poises, is used in injection blow molding of 3-oz. aerosol containers. The containers have a burst strength of 225 psi.

For comparison purposes, linear PET (i.e., without branching constituents such as pentaerythritol) with a melt viscosity of 10,000 poises, cannot be used in injection blow molding because of insufficient melt strength of the plastic, causing sagging and drolling of the melt during processing, and failure to inflate to the desired configuration without bursting.

EXAMPLE 5

Shaped articles are made by extrusion blow molding. A ¾" parison of branched PET, containing 0.22 mole % pentaerythritol branching agent, and having a melt viscosity at 250° C. of 10,000 poise, is extruded upward into a jug mold. The preform, molten parison is inflated into a ½ gal. handle ware jug of good appearance and properties.

EXAMPLE 6

The procedure of Example 5 is repeated with branched PET containing 0.48 mole % trimethylol ethane branching agent and having a melt viscosity of 10,000 poises. Again good extrusion blow molded parts are obtained.

EXAMPLE 7

Shaped articles are prepared by blown film extrusion. Branched PET containing 0.22 mole % pentaerythritol branching agent and with a melt viscosity (at 250° C.) of 10,000 poises is extruded into a shaped, self-supporting molten thin-walled tube of 2" diameter. The melt temperature is 470° F. and the die temperature is 440° F.

The extruded tube, while still melted is then inflated five-fold to yield a final, shaped tube of 10" diameter and a wall thickness of 0.001". The film has excellent color, smoothness and strength.

For comparison purposes, when linear PET of 10,000 poises melt viscosity is used, the melt tube bursts upon inflation instead of expanding as desired.

EXAMPLE 8

The procedure of Example 7 is repeated using a branched PET containing 0.40 mole % of trimethylol propane branching agent. Again a strong, smooth film of excellent strength is obtained.

EXAMPLE 9

Shaped articles are prepared by co-extrusion. Branched PET, containing 0.22 mole % pentaerythritol, and with a melt viscosity at 250° C. of 10,000 poises, is co-extruded with low-density polyethylene (LDPE) to yield a composite of 0.0045" PET and 0.0075" LDPE. Processing is facile and the product has excellent appearance and properties.

For comparison purposes, linear PET of the same melt viscosity was co-extruded with polyethylene, but did not process well and did not yield a satisfactory product.

EXAMPLE 10

Shaped articles are prepared by profile extrusion. Branched PET containing 0.35 mole % trimesic acid branching agent, and with a melt viscosity at 250° C. of 15,000 poises is extruded through an annular die and the preform extrudate is quenched to yield a pipe of 1" diameter and 1/16" wall thickness. The pine has excellent roundness and constant wall thickness.

For comparison purposes, under the same conditions, linear PET yields a pipe of distorted dimensions due to sagging and running of the melted extrudate prior to quenching.

EXAMPLE 11

Shaped articles are prepared by foam molding. Branched PET containing 0.15 mole % benzene tetracarboxylic acid branching agent is blended with 0.2% 5-phenyl tetrazole blowing agent and molded into 1" thick slabs. The slabs have good mechanical properties and appearance. Upon sectioning they show a desirable even distribution of small bubbles throughout the part. When linear PET is foam molded under identical conditions, the parts are mechanically weak, due to an uneven distribution of internal bubble sizes, resulting in large internal voids, and sagging of the part due to collapse of the preform foam structure before the melt solidifies.

The examples illustrate how the elastic nature of the branched polymer melts allows expansion of the material into the desired shapes by a variety of fabrication techniques whereas the linear polymers under similar conditions lose their integrity and/or shape.

Thus, it has been demonstrated that the melt elasticity and other important extrusion process parameters are improved by adding small amounts of pentaerythritol, trimethylol ethane, trimethylol propane, trimesic acid, and benzene tetracarboxylic acid branching agents to a mixture of reactants used to produce a typical poly(alkylene terephthalate) polyester.

Other modifications of the above examples provide compositions within the scope of this invention.

For the butane-1,4-diol, substitute ethylene glycol. For 1 mole % of the dimethyl terephthalate, substitute dimethyl adipate or dimethyl isophthalate.

Obviously, other modifications and variations of the present invention are possible in the light of the above teachings. It is, therefore, to be understood that changes may be made in the particular embodiments described which are within the full intended scope of the invention as defined by the appended claims.

We claim:

1. A hollow shaped article blow molded from a composition comprising a branched, high molecular weight poly(1,4-butylene terephthalate) resin including from 0.05 to 3 mole %, based on the terephthalate units, of a branching component which contains at least three ester-forming groups.

2. A hollow shaped article as defined in claim 1 wherein the branching component is a polyol.

3. A hollow shaped article as defined in claim 2 wherein the polyol is pentaerythritol.

4. A hollow shaped article as defined in claim 2 wherein the polyol is trimethylolpropane.

5. A hollow shaped article as defined in claim 1 wherein the intrinsic viscosity of the polyester is within the range of 0.7 to 1.6 deciliters per gram, measured as a solution in a 60:40 mixture of phenol and tetrachloroethane at 30° C.

6. A hollow shaped article as defined in claim 2 wherein the pentaerythritol units comprise from about 0.1 to about 1 mole %, based on the terephthalate component.

7. A hollow shaped article as defined in claim 1 blow molded by injection blow molding.

8. A hollow shaped article as defined in claim 1 blow molded by extrusion blow molding.

9. A thermoformable polymer film blow molded from a composition comprising a branched high molecular weight poly(1,4-butylene terephthalate) resin including from 0.05 to 3 mole %, based on the terephthalate units, of a branching component which contains at least three ester-forming groups.

10. A process for the preparation of a hollow shaped article comprising:
   (a) providing a composition comprising a branched high molecular weight poly(1,4-butylene terephthalate) resin including from 0.05 to 3 mole %, based on the terephthalate units, of a branching component which contains at least three ester-forming groups; and thereafter
   (b) blow molding said composition to form the hollow shaped article.

11. A process as recited in claim 10, wherein the article is blow molded by injection blow molding.

12. A process as recited in claim 10, wherein the article is blow molded by extrusion-blow molding.

13. A process for the preparation of a thermoformable polymer film comprising:
   (a) providing a composition comprising a branched high molecular weight poly(1,4-butylene terephthalate) resin including from 0.05 to 3 mole %, based on the terephthalate units, of a branching component which contains at least three ester-forming groups; and thereafter,
   (b) blow molding said composition to form a polymer film.

* * * * *